United States Patent
Gorath et al.

(10) Patent No.: US 12,457,679 B2
(45) Date of Patent: Oct. 28, 2025

(54) METHOD FOR GENERATING A PLASMA FLAME AND PLASMA FLAME GENERATING APPARATUS

(71) Applicant: Muegge GmbH, Reichelsheim (DE)

(72) Inventors: Moritz Johann Gorath, Reichelsheim (DE); Jens Hofmann, Reichelsheim (DE); Markus Reichmann, Michelstadt (DE)

(73) Assignee: Muegge GmbH, Reichelsheim (DE)

( * ) Notice: Subject to any disclaimer, the term of this patent is extended or adjusted under 35 U.S.C. 154(b) by 19 days.

(21) Appl. No.: 18/682,983

(22) PCT Filed: Jul. 12, 2022

(86) PCT No.: PCT/EP2022/069406
§ 371 (c)(1),
(2) Date: Feb. 12, 2024

(87) PCT Pub. No.: WO2023/016733
PCT Pub. Date: Feb. 16, 2023

(65) Prior Publication Data
US 2024/0431013 A1    Dec. 26, 2024

(30) Foreign Application Priority Data
Aug. 10, 2021  (DE) .......................... 102021120826.2

(51) Int. Cl.
*H05H 1/30*  (2006.01)
*H05H 1/28*  (2006.01)

(52) U.S. Cl.
CPC ................ *H05H 1/30* (2013.01); *H05H 1/28* (2013.01)

(58) Field of Classification Search
CPC .................................. H05H 1/30; H05H 1/28
See application file for complete search history.

(56) References Cited

U.S. PATENT DOCUMENTS 5,235,155 A  *  8/1993  Yamada ............... H05H 1/3405
                                                219/121.51
5,349,154 A  *  9/1994  Harker .................. C30B 25/105
                                                117/103
(Continued)

FOREIGN PATENT DOCUMENTS

CA       3131641 A1    10/2020
CN    102271452 A  *  12/2011
(Continued)

*Primary Examiner* — Adam D Houston
(74) *Attorney, Agent, or Firm* — CALDERON SAFRAN & WRIGHT P.C.

(57) ABSTRACT

A method and plasma-generating device for generating a plasma flame with a plasma combustion gas blown in a plasma flame direction from a plasma combustion chamber through a plasma flame opening. The plasma combustion chamber is arranged in a cavity resonator to which microwave energy is supplied and generates plasma. A swirling gas is blown into the plasma combustion chamber by a swirl-generating device to generate a swirling gas shell which surrounds the plasma flame and shields a plasma combustion chamber wall composed of a dielectric solid material. The plasma combustion chamber wall protrudes along the plasma flame direction beyond the cavity resonator in both directions and is fixed in a plasma combustion chamber wall holder a distance from the cavity resonator. The plasma combustion chamber wall holder has at least one holder cooling cavity through which a coolant flows.

13 Claims, 2 Drawing Sheets

(56) References Cited

U.S. PATENT DOCUMENTS

| | | | |
|---|---|---|---|
| 10,912,183 B2* | 2/2021 | Zhang | H05H 1/3421 |
| 11,160,156 B2* | 10/2021 | Leiteritz | B23K 10/00 |
| 12,040,162 B2* | 7/2024 | Kozlowski | H01J 37/32201 |
| 2003/0201257 A1* | 10/2003 | Crawmer | H05H 1/34 |
| | | | 219/121.52 |
| 2007/0034154 A1* | 2/2007 | Fink | H01J 37/321 |
| | | | 156/345.48 |
| 2010/0048975 A1* | 2/2010 | Uhm | A62D 3/178 |
| | | | 588/311 |
| 2010/0224324 A1* | 9/2010 | Kasai | H01J 37/3222 |
| | | | 118/723 AN |
| 2012/0235569 A1* | 9/2012 | Lee | H05H 1/46 |
| | | | 219/121.48 |
| 2012/0285817 A1* | 11/2012 | Song | B22F 3/003 |
| | | | 977/840 |
| 2013/0126487 A1* | 5/2013 | Crowe | H05H 1/38 |
| | | | 219/121.48 |
| 2013/0175244 A1* | 7/2013 | Griffin | B23K 10/00 |
| | | | 219/121.48 |
| 2015/0342019 A1* | 11/2015 | Peters | B23K 10/006 |
| | | | 219/121.51 |
| 2016/0074887 A1* | 3/2016 | Kitamura | B05B 7/224 |
| | | | 239/79 |
| 2017/0280547 A1* | 9/2017 | Mitra | H05H 1/34 |
| 2017/0291244 A1* | 10/2017 | Peters | H05H 1/34 |
| 2019/0221402 A1* | 7/2019 | Glukhoy | H01J 37/3288 |
| 2019/0300998 A1* | 10/2019 | Moon | C23C 4/02 |
| 2020/0312627 A1* | 10/2020 | McClelland | H01J 37/32623 |
| 2022/0009019 A1* | 1/2022 | Dunbar | B23K 9/29 |
| 2023/0001375 A1* | 1/2023 | Kozlowski | B01J 19/126 |
| 2023/0001376 A1* | 1/2023 | Kozlowski | B01J 19/088 |
| 2023/0411123 A1* | 12/2023 | Kozlowski | H01J 37/32449 |
| 2024/0238750 A1* | 7/2024 | Hong | B01J 19/088 |
| 2024/0431013 A1* | 12/2024 | Gorath | H05H 1/28 |

FOREIGN PATENT DOCUMENTS

| | | | | |
|---|---|---|---|---|
| CN | 118077315 A | * | 5/2024 | H05H 1/471 |
| EP | 0710054 A1 | * | 5/1996 | B23K 10/00 |
| JP | 2002336688 A | * | 11/2002 | |
| JP | 2003168594 A | * | 6/2003 | |
| JP | 2008300280 A | * | 12/2008 | |
| WO | WO-2023016733 A1 | * | 2/2023 | H05H 1/28 |

* cited by examiner

METHOD FOR GENERATING A PLASMA FLAME AND PLASMA FLAME GENERATING APPARATUS

CROSS-REFERENCE TO RELATED APPLICATIONS AND CLAIM TO PRIORITY

This application is a national stage application of International Application No. PCT/EP2022/069406 filed Jul. 12, 2022, which claims priority to German Patent Application No. 10 2021 120 826.2 filed Aug. 10, 2021, the disclosures of which are incorporated herein by reference and to which priority is claimed.

FIELD OF THE INVENTION

The invention relates to a method for generating a plasma flame with a plasma combustion gas blown out in a plasma flame direction through a plasma flame opening from a plasma combustion chamber, wherein the plasma combustion chamber is at least partially arranged in a cavity resonator and microwave energy is supplied to the cavity resonator via a waveguide to generate a plasma in the plasma combustion chamber, and wherein a swirl generating device is used to inject a swirl gas into the plasma combustion chamber in order to generate, in the plasma combustion chamber, a swirl gas jacket surrounding the plasma flame, which jacket shields a plasma combustion chamber wall made of a dielectric solid material from the plasma flame.

BACKGROUND OF THE INVENTION

Such plasma flames have a very high energy density and are used in many different applications to generate a very high process temperature in a process chamber or in the vicinity of the plasma flame opening; for example, to coat, machine or weld workpieces. In this process, a plasma is generated in a plasma combustion chamber for the application of plasma chemical processes, which is blown out of the plasma combustion chamber with a plasma gas supplied to the plasma combustion chamber, thereby forming a plasma flame that can be used in plasma treatment processes. The plasma flame direction is defined by the flow direction of the plasma gas blown out of the plasma combustion chamber through the plasma flame opening.

It is known from practice that the energy required for generating plasma can be supplied as microwave energy via a waveguide to a cavity resonator in which the plasma combustion chamber is arranged in such a way that an economically reasonable proportion of the microwave energy in the plasma combustion chamber can be used to generate the plasma. In many cases, the direction of the plasma flame is perpendicular to the direction of propagation of the microwaves from the waveguide into the cavity resonator. The plasma combustion chamber may extend through the cavity resonator and the plasma flame opening of the plasma combustion chamber may be arranged such that the plasma flame discharged from the plasma combustion chamber through the plasma flame opening also leaves the cavity resonator and may be supplied to the intended use outside the cavity resonator.

The cavity walls of the cavity resonator are usually made of an electrically conductive material in order to provide or fulfil the resonance conditions for the microwave energy supplied via a waveguide in the cavity resonator. In contrast, a plasma combustion chamber wall is made of a dielectric solid material and effects a microwave-transparent, spatial separation from the plasma combustion chamber and the metallic cavity resonator by a dielectric medium, which is necessary for the operation of the plasma generating apparatus. This prevents the plasma from leaving the plasma combustion chamber or the cavity resonator and, possibly, spreading through the waveguides in the direction of the generator and thereby bringing about destructive effects.

Due to the plasma generated in the plasma combustion chamber, the interior of the plasma combustion chamber as well as the plasma combustion chamber wall are strongly heated. In many cases, a maximum possible heat output of the plasma flame during operation is limited by the fact that a heat transfer from the plasma flame to the surrounding plasma combustion chamber wall becomes too great and the plasma combustion chamber wall is damaged as a result. To avoid damage to the plasma chamber wall, it is therefore necessary to prevent excessive heating of the plasma chamber wall.

It is known from practice that a portion of the plasma combustion gas flowing into the plasma combustion chamber or a separate gas is injected into the plasma combustion chamber as swirl gas with a swirl generating device transverse to the plasma flame direction in order to generate, in the plasma combustion chamber, a swirl gas jacket surrounding the plasma flame, which jacket shields the plasma combustion chamber wall from the plasma flame and thereby reduces heat transfer from the plasma flame into the surrounding plasma combustion chamber wall. The orientation of the swirl gas transverse to the plasma flame direction is preferably approximately tangential to the plasma combustion chamber wall, but an orientation at an angle between 0 and 90 degrees, preferably between 0 and 15 degrees, between the plasma combustion chamber wall can also be specified in order to produce a swirl gas jacket flowing predominantly along the plasma combustion chamber wall.

However, it has been shown that despite such measures, a permanently possible heat output of the plasma flame during operation is limited, wherein the heat output is unevenly distributed along the plasma flame direction and thus regularly causes inhomogeneous heating of the plasma combustion chamber wall along the plasma flame opening, which in many cases leads to locally limited excessive thermal stress on the plasma combustion chamber wall and thus to damage of the plasma combustion chamber wall.

SUMMARY OF THE INVENTION

It is therefore considered to be an object of the present invention to design a method for generating a plasma flame as mentioned at the outset in such a way that the plasma flame can be generated with as high a thermal output as possible and can be blown out of the plasma combustion chamber in a process-safe manner.

This object is achieved according to the invention in that the plasma burning chamber wall protrudes in both directions along the plasma flame direction beyond the cavity resonator and is fixed in each case at a distance from the cavity resonator in a plasma combustion chamber wall support, wherein the plasma combustion chamber wall support comprises at least one support cooling cavity through which a coolant flows. It has been shown that large gradients in the heating of the plasma combustion chamber wall can occur, particularly in an area around the plasma combustion chamber wall support. In order to reduce these gradients and to enable the plasma combustion chamber wall to be heated as homogeneously as possible, it is therefore provided in accordance with the invention that the plasma combustion chamber wall is not fixed inside the cavity resonator but outside the cavity resonator and, in addition, is fixed in a plasma combustion chamber wall support in each case at a distance from the cavity resonator. Due to the additional distance of the plasma combustion chamber wall support to the cavity resonator, the distance of the direct material contact between the plasma combustion chamber wall support, on the one hand, and the plasma combustion chamber wall, on the other hand, is arranged at a distance from the cavity resonator and the energy transfer from the irradiated microwave into the plasma combustion chamber effected therein.

However, as the distance between the plasma combustion chamber wall support, on the one hand, and the cavity resonator, on the other hand, cannot or should not be specified as large in practice, it is also provided according to the invention that each plasma combustion chamber wall support comprises at least one support cooling chamber through which a coolant flows. In this way, the plasma combustion chamber wall support can be cooled, in particular in a contact area with the plasma combustion chamber wall, and undesired heating of the plasma combustion chamber wall in the area of the plasma combustion chamber wall supports can be reduced or avoided. In addition, the plasma combustion chamber wall support cooled by the coolant can cool the plasma combustion chamber wall in direct contact therewith.

According to an advantageous design of the inventive concept, it is provided that a coolant is conveyed along the plasma flame direction at least on one side of the cavity resonator in a cooling section between the plasma combustion chamber wall and a surrounding cooling section wall and the coolant contacts the plasma combustion chamber wall in the process. Due to the coolant flowing around and directly contacting the plasma combustion chamber wall, the plasma combustion chamber wall is additionally cooled in an area between the plasma combustion chamber wall support, on the one hand, and the cavity resonator, on the other. In this way, it is possible to generate the plasma flame with a higher heat output and blow it out of the plasma combustion chamber without fear of unwanted damage to the plasma combustion chamber during operation.

Optionally, it can be provided that a coolant flows through at least one after-cooling channel an after-cooling wall of the after-cooling device in the plasma flame direction in an aftercooling device adjoining the plasma combustion chamber wall support. With the help of such an after-cooling section, a transition of the plasma flame from the plasma combustion chamber to the environment can be controlled and an otherwise possibly too great a temperature gradient in a transition area from the plasma combustion chamber to the environment can be reduced. The coolant flows through one or more continuous after-cooling channels arranged in the after-cooling wall of the after-cooling section. The coolant does not come into direct contact with the plasma combustion chamber wall. The after-cooling wall can consist of a suitable material with a as well as for the plasma combustion chamber wall support and the after-cooling section. high thermal conductivity, such as metal. In addition to a suitable cooling gas, a coolant liquid can also be used as a coolant. The after-cooling channel is thereby fluid-tightly separated from the cooling section between the plasma combustion chamber wall support and the cavity resonator, so that the coolant flowing through the at least one after-cooling channel of the after-cooling wall cannot enter the cooling sections and the cavity resonator. In this way, an optimally suitable coolant can be used for each of the cooling sections as well as for the plasma combustion chamber wall support and the after-cooling section.

To increase the maximum heat output achievable with the plasma flame in continuous operation, it is optionally provided according to the invention that a second plasma combustion chamber with a second cavity resonator associated with the second plasma combustion chamber and a swirl generating device associated with the second plasma combustion chamber is arranged downstream of a first plasma combustion chamber in the plasma flame direction, and in that the plasma flame is blown out of the first plasma combustion chamber in the plasma flame direction through the second plasma combustion chamber and out of the second plasma combustion chamber. It is also conceivable that one or more further plasma combustion chambers are arranged downstream. In this way, separate plasma combustion wall supports, separate cooling sections and separate swirl generating devices can be provided for each plasma combustion chamber to be able to coordinate the cooling effect and the plasma combustion gas flow as well as the swirl gas jacket surrounding the plasma flame in each case. As two or more plasma combustion chambers separated from each other are operated with cooling devices assigned to the respective plasma combustion chamber, a complex plasma process with different process gases, process gas flows or outputs, etc., can be carried out in a cascading manner. The second plasma combustion chamber downstream of the first plasma combustion chamber can be operated with process parameters that differ from those of the first plasma combustion chamber, for example at higher temperatures. The respective cooling devices and coolants, as well as the operation of the cooling devices, can be adjusted in each plasma combustion chamber to the respective process parameters, i.e. to different process gases or different temperatures, for example, and in this way it is possible that the two plasma combustion chambers can each be operated autonomously and independently of one another, and the respective cooling system can be adjusted to an individual radiation behaviour of the plasma flame. In this way, a much hotter plasma flame with a significantly higher heat output, even in continuous operation, can be generated than is currently possible with a conventional plasma generating apparatus.

In an advantageous manner, a preferred embodiment of the inventive concept is consequently provided in that a coolant flow through the support cooling cavity and a coolant flow through the cooling section and, if appropriate, a coolant flow through the after-cooling device are coordinated with one another in such a way that the most uniform possible temperature distribution possible is specified in the plasma flame direction in the plasma combustion chamber wall. It has been shown that in many cases damage to the plasma combustion chamber wall is significantly caused by a very uneven temperature distribution in the plasma combustion chamber wall, whereas with an even temperature distribution the same plasma combustion chamber wall could also withstand comparatively high temperatures. To avoid an uneven temperature distribution, it can be provided according to the invention that the operation of the individual cooling devices is coordinated with one another in such a way that the temperature distribution in the plasma combustion chamber wall is as uniform as possible along the plasma flame direction. Among other things, this can result in a single cooling device not necessarily being operated at maximum possible cooling capacity. In addition, it can be provided that the operation of the individual cooling devices and thus the respective coolant flow through the support cooling cavity, through the cooling section and, if applicable, through the after-cooling section is also adapted to the respective current operation of the plasma generating apparatus and the plasma flame generated thereby and its thermal output.

It can also be provided that the cooling capacities of the individual cooling devices are controlled during operation in such a way that the temperature distribution in the plasma combustion chamber wall is as uniform as possible. For this purpose, temperature parameters can be recorded along the plasma flame direction and evaluated with the aid of a control device to coordinate the cooling capacities of the individual cooling devices and to achieve a uniform temperature distribution.

The invention also relates to a plasma generating apparatus with a plasma combustion chamber through which a plasma combustion gas can flow and emerge from a plasma flame opening, wherein the plasma combustion chamber is at least partially arranged in a cavity resonator with electrically conductive cavity walls, so that microwave energy supplied into the cavity resonator via a waveguide can be used to generate a plasma in the plasma combustion chamber and the plasma can be blown out of the plasma combustion chamber with the plasma combustion gas as a plasma flame in a plasma flame direction through the plasma flame opening, wherein the plasma combustion chamber comprises a plasma combustion chamber wall made of a dielectric solid material to effect a microwave-transparent spatial separation of the plasma combustion chamber and the electrically conductive cavity walls of the cavity resonator, and wherein a swirl generating device is arranged on the plasma combustion chamber, with which a swirl gas can be injected into the plasma combustion chamber transversely to the plasma flame direction.

Various plasma generating apparatus are known from practice with which a plasma flame can be generated that can be blown out of a plasma combustion chamber. Such plasma generating apparatus are used, for example, as plasma cutting devices with a plasma flame escaping into the environment. Plasma generating apparatus are also known in which the plasma flame generated with them is directed into a process chamber and used to treat workpieces or process material. Experience has shown that generating plasma with microwave energy is comparatively efficient and enables precise control of the generated plasma flame as well as a high heat output compared to other plasma generating apparatus, which can be applied and utilised with the plasma flame from the plasma combustion chamber.

It is already known from practice that, in order to avoid excessive heating of the plasma combustion chamber wall, a swirl gas is injected into the plasma combustion chamber transversely to the plasma flame direction in order to create a swirl gas jacket surrounding the plasma flame, which shields the plasma combustion chamber wall from the plasma flame. This can reduce heat transfer from the plasma in the plasma combustion chamber to the surrounding plasma combustion chamber wall and thus reduce thermal stress on the plasma combustion chamber wall. However, it has been shown that, in particular in the case of long-term operation of such a plasma generating apparatus and a hot plasma flame generated thereby with a high heat output, the thermal stresses and, in particular, an uneven temperature distribution in the plasma combustion chamber wall can lead to the plasma combustion chamber wall being excessively stressed and thus being damaged prematurely and having to be replaced, which impairs economically viable operation of such a plasma generating apparatus at high heat outputs.

It is therefore considered to be a further aspect of the invention to further develop and design such a plasma generating apparatus in such a way that the most permanent operation possible becomes possible with a high thermal output of the plasma flame generated in the plasma combustion chamber.

According to the invention, this object is achieved in that the plasma generating apparatus comprises two plasma combustion chamber wall supports, which are each arranged at a distance from the cavity resonator and to which the plasma combustion chamber wall is fixed, wherein the plasma combustion chamber wall supports each comprise at least one support cooling cavity through which a coolant can flow in order to be able to cool an area of the plasma combustion chamber wall support that is in contact with the plasma combustion chamber wall. It has been shown that in particular in an area of the plasma combustion chamber wall in which the plasma combustion chamber wall is in heat-transferring contact with a support or with the surrounding cavity resonator, an uneven temperature distribution in the plasma combustion chamber wall occurs particularly frequently during operation of the plasma generating apparatus. The distance between the plasma combustion chamber wall support and the cavity resonator, which is predetermined according to the invention, also predetermines a distance between the area within the plasma combustion chamber in which the plasma is generated by the microwave energy introduced into the cavity resonator and the thermal bridge between the plasma combustion chamber wall and the plasma combustion chamber wall support, and distributes an unavoidable temperature gradient along the plasma flame direction over a larger area of the plasma combustion chamber wall. In addition, the design of the plasma combustion chamber wall supports according to the invention, which each comprise a support cooling cavity through which a coolant can flow, means that the heat transfer from the plasma combustion chamber through the plasma combustion chamber wall into the plasma combustion chamber wall supports effected via the plasma combustion chamber wall supports can be controlled and predetermined in such a way that an uneven temperature distribution within the plasma combustion chamber wall in the area of the plasma combustion chamber wall supports in direct contact with the plasma combustion chamber wall can be controlled.

According to an advantageous configuration of the inventive concept, it is provided that the plasma generating apparatus comprises, at least on one side of the cavity resonator between the associated plasma combustion chamber wall support and the cavity resonator, a cooling section with a cooling section wall arranged at a distance from the plasma combustion chamber wall, wherein a coolant can be conveyed through the cooling section between the cooling section wall and the plasma combustion chamber wall. The coolant conveyed between the cooling section wall and the plasma combustion chamber wall through the cooling section comes into direct contact with the plasma combustion chamber wall and can efficiently absorb and dissipate a thermal energy transferred from the plasma generated in the plasma combustion chamber into the plasma combustion chamber wall. As direct contact between the plasma combustion chamber wall, on the one hand, and the cooling section wall, on the other, is avoided, this favours a comparatively uniform temperature distribution in the plasma combustion chamber wall around which the coolant flows. A length of the cooling section extending in the plasma flame direction may be adapted to the intended operation of the plasma generating apparatus and the heat output generated thereby of the plasma generated in the plasma combustion chamber and of the plasma flame blown out of the plasma combustion chamber. It has been found advantageous that the cooling section has a length in the direction of the plasma flame direction that is greater than a corresponding dimension of the cavity resonator in the plasma flame direction.

A suitable gas or a coolant liquid can be used as a coolant. When a cooling gas is used, it may be provided that the coolant conveyed through the cooling section may also flow into the cavity resonator and be discharged from the cavity resonator spaced apart from the plasma combustion chamber wall.

In order to promote the highest possible heat dissipation away from the plasma combustion chamber wall in the cooling section, it is optionally provided in accordance with the invention that the cooling section wall is surrounded by a cooling section cavity and the cooling section wall comprises a plurality of cooling fins. The cooling fins significantly increase the surface area of the cooling section wall that can be used for heat transfer, so that more heat energy can be absorbed and dissipated by the coolant that is conveyed through the cooling section. The number, orientation and dimensions of the individual cooling fins can advantageously be adapted to the cooling capacity intended for the intended use of the plasma generating apparatus.

Preferably, it is provided that the plurality of cooling fins are arranged in the circumferential direction around the plasma flame direction and directed away from the plasma combustion chamber wall. The cooling fins thus do not impair a coolant flow surrounding the plasma combustion chamber wall in a jacket-like manner and a thereby promoted uniform temperature distribution in the plasma combustion chamber wall within the cooling section. On a side of the cooling section wall facing away from the plasma combustion chamber wall, the surface area of the coolant wall that can be used for heat dissipation can be considerably increased by the plurality of cooling fins, without this compromising the most uniform temperature distribution possible in the plasma combustion chamber wall. The cooling section wall is expediently surrounded by a cooling section housing which also surrounds the plasma combustion chamber wall, so that a coolant space is formed between the cooling section wall with the cooling fins protruding radially outwards and the cooling section housing, through which a coolant can also flow and thereby absorb and dissipate heat.

To avoid an excessive temperature gradient of the plasma combustion chamber wall in an exit area of the plasma flame from the plasma generating apparatus, it is optionally provided that the plasma generating apparatus comprises an after-cooling device in an after-cooling section adjoining the plasma combustion chamber wall support in the plasma flame direction, wherein the after-cooling device comprises at least one aftercooling channel in an after-cooling wall, through which a coolant can flow. With the after-cooling device, a cooling power can be generated in an end area of the plasma combustion chamber wall by the after-cooling device arranged there, which can be predetermined independently of the cooling in the plasma combustion chamber wall support and independently of the cooling in a cooling section between the plasma combustion chamber wall support and the cavity resonator and can be effected during operation of the plasma generating apparatus. In this way, it is possible to respond individually to the different thermal loads on the plasma combustion chamber wall occurring along the plasma flame direction during operation of the plasma generating apparatus and, by means of the different cooling devices, to adapt the cooling power effected in the respective sections to the heat input from the plasma flame, so that the plasma combustion chamber wall heats up as uniformly as possible along the plasma flame direction, or a temperature distribution as uniform as possible is established in the plasma combustion chamber wall during operation. The same coolant, for example gaseous coolant, can be used in each of the individual cooling devices. It is also conceivable that a different coolant, and for example a liquid coolant, is used in particular in the plasma combustion chamber wall supports or in the after-cooling device in which the coolant flows through after-cooling channels provided for this purpose.

The swirl generating device is usually arranged in an area in which the plasma combustion gas is also injected into the plasma combustion chamber. This area is located opposite the plasma flame opening in the plasma combustion chamber in many plasma combustion chambers. The plasma combustion chamber is expediently tubular and bounded by a hollow cylindrical plasma combustion chamber wall.

It may be convenient for various applications that, according to one embodiment of the invention, the swirl generating device is arranged between the cavity resonator and the plasma flame opening of the plasma combustion chamber or adjacent to the plasma flame opening of the plasma combustion chamber. According to such an embodiment of the plasma generating apparatus, a swirl gas jacket surrounding the plasma flame is generated by the swirl generating apparatus, which is sucked into the plasma combustion chamber or into the cavity resonator in a direction opposite to the plasma flame direction, in order to be subsequently blown out through the plasma flame opening together with the plasma combustion gas and the plasma flame in the plasma flame direction. It has been shown that even with a flow direction opposite the plasma flame direction, a corresponding swirl gas jacket can significantly reduce the heat transfer from the plasma flame to the surrounding plasma combustion chamber wall.

With regard to the highest possible thermal output of the plasma flame generated by the plasma generating apparatus, it can optionally be provided that the plasma generating apparatus comprises a first plasma combustion chamber with an associated first cavity resonator and with an associated first swirl generating device, as well as a second plasma combustion chamber arranged downstream in the plasma flame direction with an associated second cavity resonator. Optionally, further plasma combustion chambers with corresponding components can be arranged one behind the other. The plasma flame generated in the first plasma combustion chamber can be further heated in the second plasma combustion chamber arranged downstream in order to increase the heat output of the plasma flame then emerging from the second plasma combustion chamber. As the plasma combustion chamber walls of the individual plasma combustion chambers can be thermally separated from one another and arranged in an insulated manner, the individual plasma combustion chambers can be operated with different process parameters during operation so that, for example, different process gases, optionally additional solids or liquids, volume flows and process gas flows or outputs can be specified in each plasma combustion chamber. The individual plasma combustion chamber walls can be cooled with the respective associated cooling devices with significantly less effort in such a way that the temperature distribution within the individual plasma combustion chamber walls is as uniform as possible.

It can further be provided that, for example, a swirl generating device is arranged between the first plasma combustion chamber and the second plasma combustion chamber, which both generates a swirl gas jacket in the first plasma combustion chamber against the plasma flame direction and generates a swirl gas jacket protruding into the second plasma combustion chamber in the plasma flame direction. This can reduce the construction effort for the manufacture of such a plasma generating apparatus with a plurality of plasma combustion chambers.

According to a particularly advantageous design on the inventive concept, it is provided that the plasma generating apparatus comprises, for the first plasma combustion chamber and for the second plasma combustion chamber, respectively associated first and second plasma combustion chamber wall supports and, respectively associated, a first and a second cooling section with a cooling section wall. The additional cooling devices enable a significant increase in the performance of the plasma generating apparatus, which more than outweighs the additional design effort in the manufacture and operation of such a plasma generating apparatus.

BRIEF DESCRIPTION OF THE DRAWINGS

In the following, exemplary embodiments of the invention are explained in more detail, which are shown in the drawing. In the figures.

DETAILED DESCRIPTION OF THE PREFERRED EMBODIMENT(S)

Figure 1:
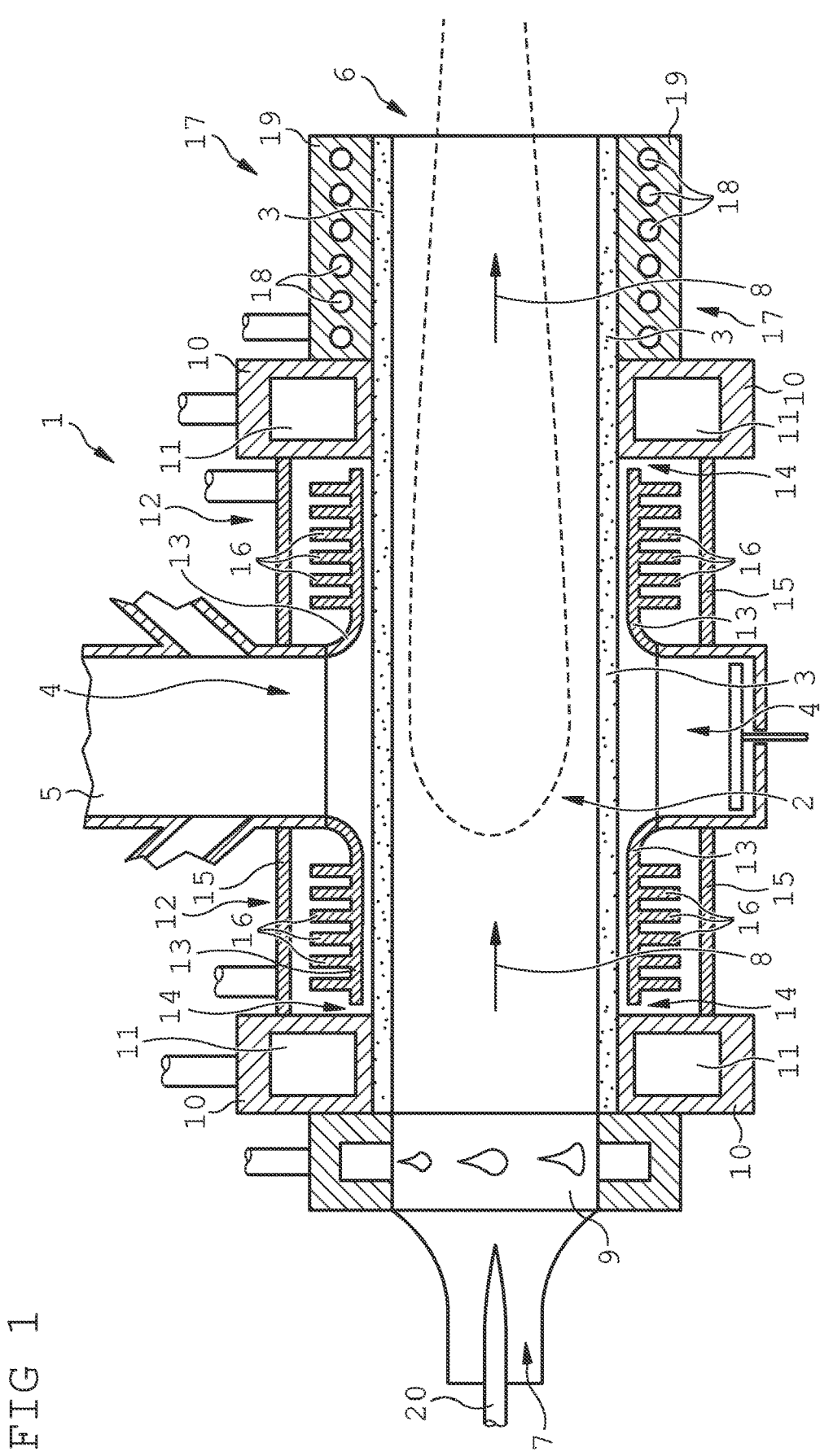
FIG. 1 shows a schematic sectional view through a plasma generating apparatus according to the invention along a plasma flame direction.

FIG. 1 shows a sectional view of a schematic representation of a plasma generating apparatus 1 according 5 to the invention. The plasma generating apparatus 1 comprises a tubular plasma combustion chamber 2 surrounded by a hollow cylindrical plasma combustion chamber wall 3 made of a dielectric material, for example quartz glass. The plasma combustion chamber 2 extends through a cavity resonator 4 of a microwave device (not shown in more detail), with which microwave energy is supplied to the cavity resonator 4 and the plasma combustion chamber 2 arranged therein via a waveguide 5. During operation of the plasma generating apparatus 1, a plasma is generated by the microwave energy supplied to the plasma combustion chamber 2.

At an end of the plasma combustion chamber 2 opposite a plasma flame opening 6, a plasma combustion gas supply device 7 is arranged, with which a plasma combustion gas is blown into the plasma combustion chamber 2. The plasma combustion gas blown into the plasma combustion chamber 2 from the plasma combustion gas supply device 7 flows through the plasma combustion chamber 2 along a plasma flame direction 8 running from the plasma combustion gas supply device 7 to the oppositely arranged plasma flame opening 6 and is blown out of the plasma combustion chamber 2 through the plasma flame opening 6 in this plasma flame direction 8.

With a swirl generating device 9 arranged between the plasma combustion gas supply device 7 and the plasma combustion chamber wall 3, a swirl gas is injected through transverse to the plasma flame direction 8 tangentially to the adjacent plasma combustion chamber wall 3 and forms a swirl gas jacket, which tubularly surrounds the plasma combustion gas blown through the plasma combustion chamber 2 in the plasma flame direction 8 and thereby forms a shielding of the plasma combustion gas from the surrounding plasma combustion chamber wall 3.

The plasma combustion chamber wall 3 is fixed in each case at a distance from the cavity resonator 4 in a plasma combustion chamber wall support 10. A support cooling cavity 11 is formed in each plasma combustion chamber wall support 10, through which a coolant can flow, which can be fed and discharged again via a coolant supply line, which is only indicated schematically. The supplied coolant is used to cool the plasma combustion chamber wall support 10 and dissipate heat from the plasma combustion chamber wall 3. Due to the respective distance between the cavity resonator 4 and the two plasma combustion chamber wall supports 10, a temperature difference between the cooled plasma combustion chamber wall supports 10 and the cavity resonator 4, in which the microwave energy is converted into plasma energy, is distributed over a greater distance along the plasma flame direction 8 and a temperature gradient within the plasma combustion chamber wall 3 is reduced.

A cooling section 12 with a cooling section wall 13 is arranged between each of the two plasma combustion chamber wall supports 10 and the cavity resonator, which surrounds the plasma combustion chamber wall 3 at a small radial distance but does not touch the plasma combustion chamber wall 3. A coolant flows between the cooling section wall 13 and the plasma combustion chamber wall 3, which is used to cool the plasma combustion chamber wall 3 in the respective cooling section 12. This avoids direct contact between the cooling section wall 13 and the plasma combustion chamber wall 3 and a thermal bridge caused by this. This favours not only the cooling effect by the coolant flowing around the plasma combustion chamber wall 3, but also the most even temperature distribution possible in the plasma combustion chamber wall 3 between the cavity resonator 4 and the plasma combustion chamber wall supports 10, each arranged at a distance on opposite sides. The coolant flowing in from an end 14 of the cooling section wall 13 facing away from the cavity resonator 4 in each case can flow into the cavity resonator 4 and be discharged from the cavity resonator via discharge openings 15 arranged at a distance from the plasma combustion chamber wall 3.

Each cooling section wall 13 comprises cooling fins running in the circumferential direction and directed radially outwards on an outer side opposite the plasma combustion chamber wall 3. A coolant flows between the outer sides of the cooling section walls 13 with the respective cooling fins 16 and a surrounding cooling section housing 15 and can absorb and dissipate heat energy from the cooling fins 16.

In the plasma flame direction 8, an after-cooling device 17 with an after-cooling channel 18 helically surrounding the plasma combustion chamber wall 3 is arranged in an after-cooling wall on a side opposite the cavity resonator 4 between the associated plasma combustion chamber wall support 10 and the plasma flame opening 6. A coolant, for example a cooling liquid, can flow through the after-cooling channel 18 during operation of the plasma generating apparatus 1 and heat can be dissipated from the plasma combustion chamber wall 3 via the after-cooling wall 19, which is in direct contact with the plasma combustion chamber wall 3.

At the start of an operation of the plasma generating apparatus 1, an ignition tip 20 can be introduced into the plasma combustion chamber 2 in an axial direction and a plasma can be ignited in the plasma combustion chamber 2 by the resulting increase in the field in the cavity resonator 4. The plasma is used to generate a plasma flame 21 in the plasma combustion gas, which is blown out of the plasma combustion chamber 2 through the plasma flame opening 6 by the plasma combustion gas flowing through the plasma combustion chamber 2 in the plasma flame direction 8.

The various cooling devices, namely the plasma combustion chamber wall supports 10, the cooling sections 12 and the after-cooling device 17 can each produce a cooling effect on the plasma combustion chamber wall 3. By means of a suitable and coordinated control of the individual cooling devices, the most uniform temperature distribution possible can be specified along the plasma flame direction 8 within the plasma combustion chamber wall 3. This reduces thermal stress on the plasma combustion chamber wall 3 and prevents premature damage to the plasma combustion chamber wall 3 due to large temperature gradients. In an advantageous manner, it is provided that the respective heating of the plasma combustion chamber wall 3 is detected with the aid of temperature sensors and a controlled operation of the individual cooling devices is carried out.

Figure 2:
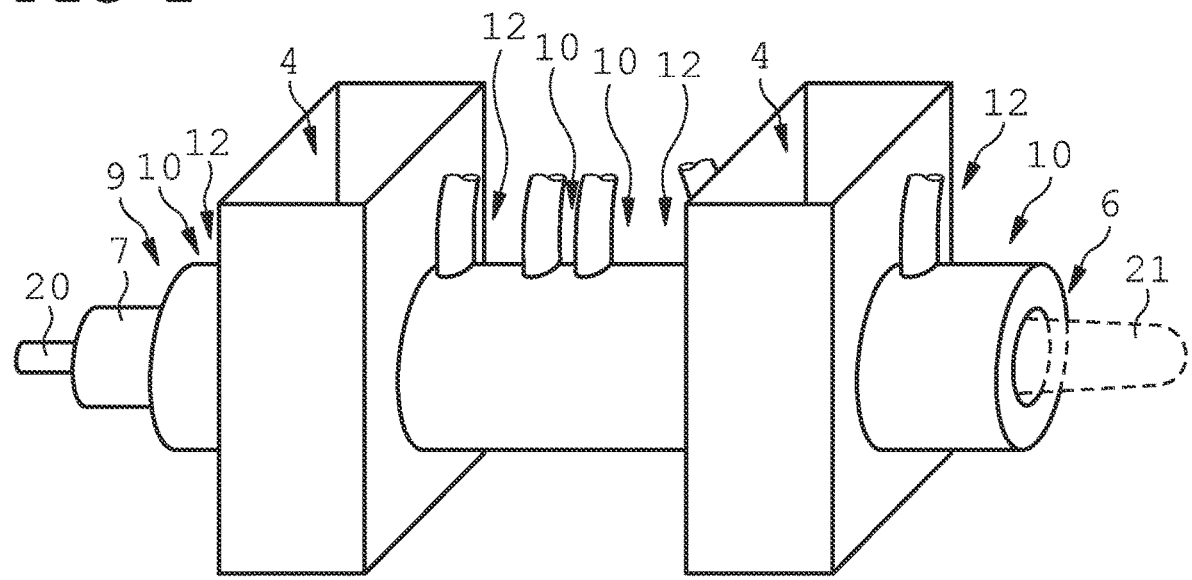
FIG. 2 shows a schematic perspective side view of a plasma generating apparatus with two plasma combustion chambers arranged one behind the other and two cavity resonators.

FIG. 2 only schematically shows a variant of the plasma generating apparatus 1, in which a second plasma combustion chamber 22 with a second cavity resonator 23 is arranged after a first plasma combustion chamber 2, which extends through a cavity resonator 4. Each plasma combustion chamber 2 comprises separate plasma combustion chamber wall supports 10, cooling sections 12 and swirl generating devices 9 (not shown in detail in FIG. 2). In the second plasma combustion chamber 22, the plasma flame 21 generated in the first plasma combustion 10 chamber 2 and blown into the second plasma combustion chamber 22 can be supplied with additional microwave energy, so that an additionally heated plasma flame 21 is blown out of the plasma flame opening 6 of the second plasma combustion chamber 2 with a significantly higher heat output.

Figure 3:
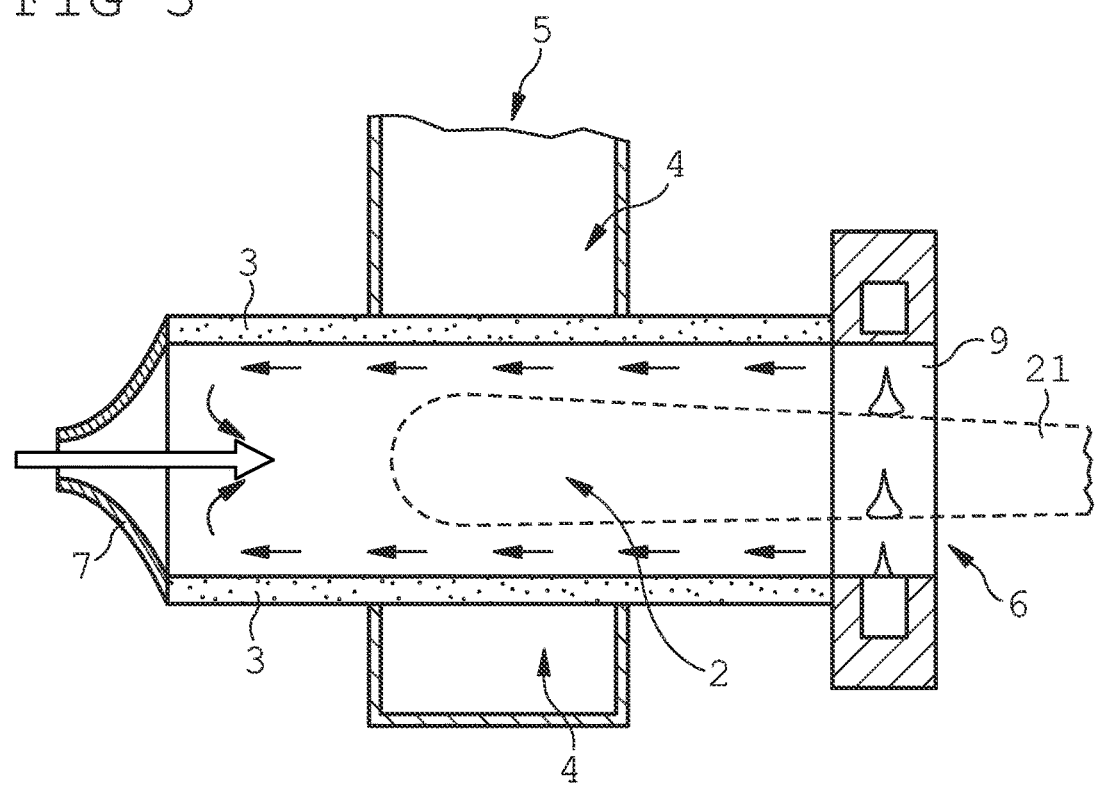
FIG. 3 shows a schematic sectional view through a plasma generating apparatus according to the invention, wherein a swirl generating device is arranged adjacent to a plasma flame opening on the plasma combustion chamber.

FIG. 3 schematically shows a possible arrangement of the swirl generating device 9 in the area of the plasma flame opening 6 according to the invention. The swirl gas blown tangentially into the plasma combustion chamber 2 through swirl gas openings 23 to the plasma combustion chamber wall 3 forms a tubular swirl gas jacket that flows into the plasma combustion chamber 2 along the plasma combustion chamber wall 3 and is deflected at an opposite end and blown through the plasma combustion chamber 2 together with the plasma combustion gas in the plasma flame direction 8 and blown out of the plasma combustion chamber 2 through the plasma flame opening 6. In this embodiment variant, too, the swirl gas jacket forms a thermal shield between the hot plasma flame 21 and the surrounding plasma combustion chamber wall 3.

The invention claimed is:

1. Method for generating a plasma flame (21) with a plasma combustion gas blown out in a plasma flame direction (8) through a plasma flame opening (6) from a plasma combustion chamber (2), wherein the plasma combustion chamber (2) is at least partially arranged in a cavity resonator (4) and microwave energy is supplied to the cavity resonator (4) via a waveguide (5) to generate a plasma in the plasma combustion chamber (2), and wherein a swirl generating device (9) is used to inject a swirl gas into the plasma combustion chamber (2) in order to generate a swirl gas jacket surrounding the plasma flame (21) in the plasma combustion chamber (2), which jacket shields a plasma combustion chamber wall (3) made of a dielectric solid material from the plasma flame (21), wherein the plasma combustion chamber wall (3) protrudes in both directions along the plasma flame direction (8) beyond the cavity resonator (4) and is fixed in each case at a distance from the cavity resonator (4) in a plasma combustion chamber wall support (10), wherein the plasma combustion chamber wall support (10) comprises at least one support cooling cavity (11) through which a coolant flows.

2. Method according to claim 1, wherein a coolant is conveyed along the plasma flame direction (8) at least on one side of the cavity resonator (4) in a cooling section (12) between the plasma combustion chamber wall (3) and a surrounding cooling section wall (13) and the coolant contacts the plasma combustion chamber wall (3) in the process.

3. Method according to claim 1, wherein a coolant flows through at least one after-cooling channel (18) in an after-cooling wall (19) of the after-cooling device (17) in the plasma flame direction (8) in an after-cooling device (17) adjoining the plasma combustion chamber wall support (10).

4. Method according to claim 2, wherein a coolant flow through the support cooling cavity (11) and a coolant flow through the cooling section (12) and, if appropriate, a coolant flow through the after-cooling device (17) are coordinated with one another in such a way that the most uniform possible temperature distribution possible is specified in the plasma flame direction (8) in the plasma combustion chamber wall (3).

5. Method according to claim 1, wherein a second plasma combustion chamber (22) with a second cavity resonator associated with the second plasma combustion chamber (22) is arranged downstream of a first plasma combustion 20 chamber (2) in the plasma flame direction (8), and in that the plasma flame (21) is blown out of the first plasma combustion chamber (2) in the plasma flame direction (8) through the second plasma combustion chamber (22) and out of the second plasma combustion chamber (22).

6. Plasma generating apparatus (1) with a plasma combustion chamber (2) through which a plasma combustion gas can flow and emerge from a plasma flame opening (6), wherein the plasma combustion chamber (2) is at least partially arranged in a cavity resonator (4) with electrically conductive cavity walls, so that microwave energy supplied into the cavity resonator (4) via a waveguide (5) can be used to generate a plasma in the plasma combustion chamber (2) and the plasma can be blown out of the plasma combustion chamber (2) with the plasma combustion gas as a plasma flame (21) in a plasma flame direction (8) through the plasma flame opening (6), wherein the plasma combustion chamber (2) comprises a plasma combustion chamber wall (3) made of a dielectric solid material to effect a microwave-transparent spatial separation of the plasma combustion chamber (2) and the electrically conductive cavity walls of the cavity resonator (4), and wherein a swirl generating device (9) is arranged on the plasma combustion chamber (2), with which a swirl gas can be injected into the plasma combustion chamber (2) transversely to the plasma flame direction (8), wherein the plasma generating apparatus (1) comprises two plasma combustion chamber wall supports (10), which are each arranged at a distance from the cavity resonator (4) and to which the plasma combustion chamber wall (3) is fixed, wherein the plasma combustion chamber wall supports (10) each have at least one support cooling cavity (11) through which a coolant can flow in order to be able to cool an area of the plasma combustion chamber wall support (10) that is in contact with the plasma combustion chamber wall (3).

7. Plasma generating apparatus (1) according to claim 6, wherein the plasma generating apparatus (1) comprises, at least on one side of the cavity resonator (4) between the associated plasma combustion chamber wall support (3) and the cavity resonator (4), a cooling section (12) with a cooling section wall (13) arranged at a distance from the plasma combustion chamber wall (3), wherein a coolant can be conveyed through the cooling section (12) between the cooling section wall (13) and the plasma combustion chamber wall (3).

8. Plasma generating apparatus (1) according to claim 7, wherein in the cooling section (12) the cooling section wall (13) is surrounded by a cooling section cavity and the cooling section wall (13) comprises a plurality of cooling fins (16).

9. Plasma generating apparatus (1) according to claim 8 wherein the plurality of cooling fins (16) are arranged in the circumferential direction around the plasma flame direction (8) and directed away from the plasma combustion chamber wall (3).

10. Plasma generating apparatus (1) according to claim 6, wherein the plasma generating apparatus (1) comprises an after-cooling device (17) in an after-cooling section adjoining the plasma combustion chamber wall support (10) in the plasma flame direction (8), wherein the after-cooling device (17) comprises at least one aftercooling channel (18) in an after-cooling wall (19), through which a coolant can flow.

11. Plasma generating apparatus (1) according to claim 6, wherein the swirl generating device (9) is arranged between the cavity resonator (4) and the plasma flame opening (6) of the plasma combustion chamber (2) or adjacent to the plasma flame opening (6) of the plasma combustion chamber (2).

12. Plasma generating apparatus (1) according to claim 6, wherein the plasma generating apparatus (1) comprises a first plasma combustion chamber (2) with an associated first cavity resonator (4) and with an associated first swirl generating device (9), as well as a second plasma combustion chamber (22) arranged downstream in the plasma flame direction (8) with an associated second cavity resonator (4).

13. Plasma generating apparatus (1) according to claim 12, wherein the plasma generating apparatus (1) comprises for the first plasma combustion chamber (2) and for the second plasma combustion chamber (22), respectively associated first and second plasma combustion chamber wall supports (10) and, respectively associated, at least one first and at least one second cooling section (12) with a cooling section wall (13).

* * * * *